US012484566B2

(12) United States Patent
Bendure

(10) Patent No.: US 12,484,566 B2
(45) Date of Patent: Dec. 2, 2025

(54) TIME RELEASE BAIT CONTAINER

(71) Applicant: Erick Bendure, Bellingham, WA (US)

(72) Inventor: Erick Bendure, Bellingham, WA (US)

( * ) Notice: Subject to any disclaimer, the term of this patent is extended or adjusted under 35 U.S.C. 154(b) by 100 days.

(21) Appl. No.: 17/999,300

(22) PCT Filed: Jun. 9, 2021

(86) PCT No.: PCT/US2021/036660
§ 371 (c)(1),
(2) Date: Nov. 18, 2022

(87) PCT Pub. No.: WO2021/252663
PCT Pub. Date: Dec. 16, 2021

(65) Prior Publication Data
US 2023/0180731 A1    Jun. 15, 2023

Related U.S. Application Data

(60) Provisional application No. 63/038,561, filed on Jun. 12, 2020.

(51) Int. Cl.
*A01K 97/04* (2006.01)
*A01K 97/02* (2006.01)

(52) U.S. Cl.
CPC .............. *A01K 97/04* (2013.01); *A01K 97/02* (2013.01)

(58) Field of Classification Search
CPC ........ A01K 97/02; A01K 97/04; A01K 97/00; A01K 69/06; A01K 69/08; A01K 69/10; A01K 69/00
USPC ............................... 43/44.59, 55, 4, 100, 105
See application file for complete search history.

(56) References Cited

U.S. PATENT DOCUMENTS

| | | | | |
|---|---|---|---|---|
| 1,470,842 A | * | 10/1923 | Hyams ................... | A01K 83/06 43/41 |
| 2,709,317 A | * | 5/1955 | Pease, Sr. .............. | A01K 97/02 43/44.99 |
| 2,799,146 A | * | 7/1957 | Meagher ................ | A01K 97/01 62/352 |
| 2,833,080 A | * | 5/1958 | Hess ...................... | A01K 97/04 220/315 |
| 4,143,479 A | * | 3/1979 | Kingston ............... | A01K 97/02 414/412 |
| 4,603,502 A | * | 8/1986 | MacDonald .......... | A01K 83/06 43/44.99 |

(Continued)

FOREIGN PATENT DOCUMENTS

| | | |
|---|---|---|
| AU | 2018101580 A4 | 11/2018 |
| WO | 2018178611 A1 | 10/2018 |
| WO | WO-2020178656 A1 * | 9/2020 ........... A01K 95/005 |

OTHER PUBLICATIONS

International Search Report and Written Opinion received for International PCT Application Serial No. PCT/US2021/036660 dated Sep. 1, 2021, 10 pages.

*Primary Examiner* — William L Gmoser
(74) *Attorney, Agent, or Firm* — Christensen O'Connor Johnson Kindness PLLC

(57) ABSTRACT

Time release bait containers can include an inner body and an outer body which can slidably engage one another and can be coupled in a sealed state by a time release coupling. The time release coupling can release after a period of time, after which the inner body can be deployed outward from the outer body by an actuator.

17 Claims, 7 Drawing Sheets

(56) References Cited

U.S. PATENT DOCUMENTS

| | | | | |
|---|---|---|---|---|
| 4,788,788 | A | * | 12/1988 | Brockett ................ A01K 97/02 43/44.99 |
| 5,054,230 | A | * | 10/1991 | Woodman ............... A01K 97/02 43/44.99 |
| 6,434,878 | B1 | * | 8/2002 | Milton ................... A01K 91/04 289/17 |
| 6,453,602 | B1 | * | 9/2002 | Russell ................. A01K 69/06 43/44.99 |
| 6,711,849 | B1 | * | 3/2004 | Moretti ................. A01K 97/02 43/44.99 |
| 7,013,595 | B1 | * | 3/2006 | Jelasco ................. A01K 97/02 43/44.9 |
| 7,152,363 | B1 | * | 12/2006 | Garcia-Cruz .......... A01K 97/02 43/44.99 |
| 9,155,291 | B1 | | 10/2015 | Russ |
| 9,380,770 | B1 | * | 7/2016 | Bailey ................... A01K 97/02 |
| 10,798,925 | B1 | * | 10/2020 | Booc ..................... A01K 97/05 |
| 11,317,617 | B1 | * | 5/2022 | Myers ................... A01K 97/04 |
| 2015/0033499 | A1 | | 2/2015 | Hayao et al. |

* cited by examiner

TIME RELEASE BAIT CONTAINER

CROSS-REFERENCE TO RELATED APPLICATIONS

The subject patent application is a national stage application under 35 U.S.C. § 371 of PCT Application No. PCT/US2021/036660, entitled "TIME RELEASE BAIT CONTAINER," filed Jun. 9, 2021, which claims priority to U.S. Provisional Application No. 63/038,561, entitled "TIME RELEASE BAIT CONTAINER," filed Jun. 12, 2020. The prior applications are incorporated by reference herein.

BACKGROUND

Aquatic traps, such as crab, prawn, shrimp, lobster and fish traps, are devices which are dropped off of fishing boats to the sea floor in order to catch crustaceans and fish. A variety of aquatic trap designs have been developed.

Aquatic traps are generally baited prior to deployment. For example, bait may be tied inside the trap. Bait releases a scent that can be detected by surrounding sea life, and the scent attracts animals into the trap. Bait generally lasts for some period of time before it is either consumed by animals or degrades and becomes ineffective. The trap may then be raised to the surface, re-baited, and returned to the sea floor for further fishing.

SUMMARY

This disclosure presents a time release bait container along with methods of manufacturing and using the disclosed container. In some examples, a time release bait container can include an inner body and an outer body which can slidably engage one another and can be coupled in a sealed state by a time release coupling. The time release coupling can release after a period of time, after which the inner body can be deployed outward from the outer body by an actuator. Further aspects of the invention are described in detail below.

BRIEF DESCRIPTION OF THE DRAWINGS

Various features and attendant advantages of the disclosed technologies will become fully appreciated when considered in conjunction with the accompanying drawings, in which like reference characters designate the same or similar parts throughout the several views, and wherein.

DETAILED DESCRIPTION

Figure 1:
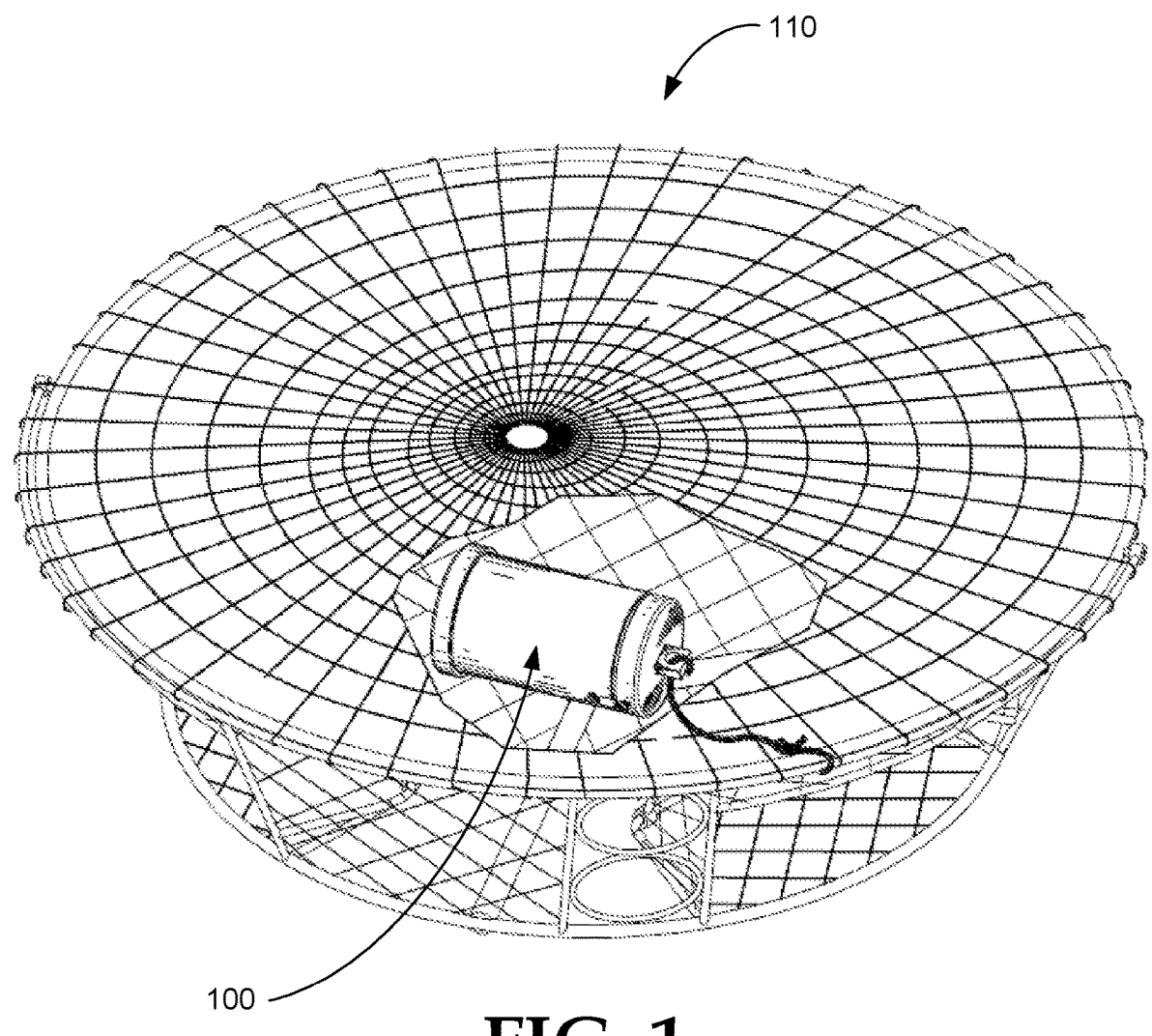
FIG. 1 illustrates an example time release bait container disposed inside an aquatic trap.

Prior to explaining embodiments of the invention in detail, it is to be understood that this disclosure is not limited to the details of construction or arrangements of the components and method steps set forth in the following description or illustrated in the drawings. Embodiments of this disclosure are capable of other embodiments and of being practiced and carried out in various ways. Also, it is to be understood that the phraseology and terminology employed herein are for the purpose of the description and should not be regarded as limiting.

FIG. 1 illustrates an example time release bait container 100 disposed inside an aquatic trap 110, in accordance with at least some embodiments of the present disclosure. In general, the function of the time release bait container 100 can be to protect bait disposed inside the time release bait container 100 for a period of time, and to expose the bait thereafter.

In an example, the aquatic trap 110 can be baited with both exposed bait (e.g., bait that is not inside the time release bait container 100) as well as with the time release bait container 100. Animals (e.g., crab or other animals) will initially smell and consume the exposed bait, and the exposed bait will last for some period of time before eventually degrading and becoming ineffective.

The time release bait container 100 can be configured to release after a delay, thereby exposing the bait inside the time release bait container 100. Animals will smell and/or consume the bait inside the time release bait container 100 for an additional period of time thereafter, until the bait inside the time release bait container 100 degrades. Because of the delay in exposing the bait inside the time release bait container 100, the overall time in which the aquatic trap 110 is baited is extended, thereby increasing the yield of the aquatic trap 110.

In another example, the aquatic trap 110 can be baited with multiple time release bait containers 100, wherein the multiple time release bait containers 100 include bait containers configured for release at different times. Similar to the above example, this allows for extending the overall length of time the aquatic trap 110 is baited. Such a technique can also be used, e.g. to stagger fishing start times of different traps, or to delay the start of fishing with the aquatic trap 110 for any purpose.

Figure 2:
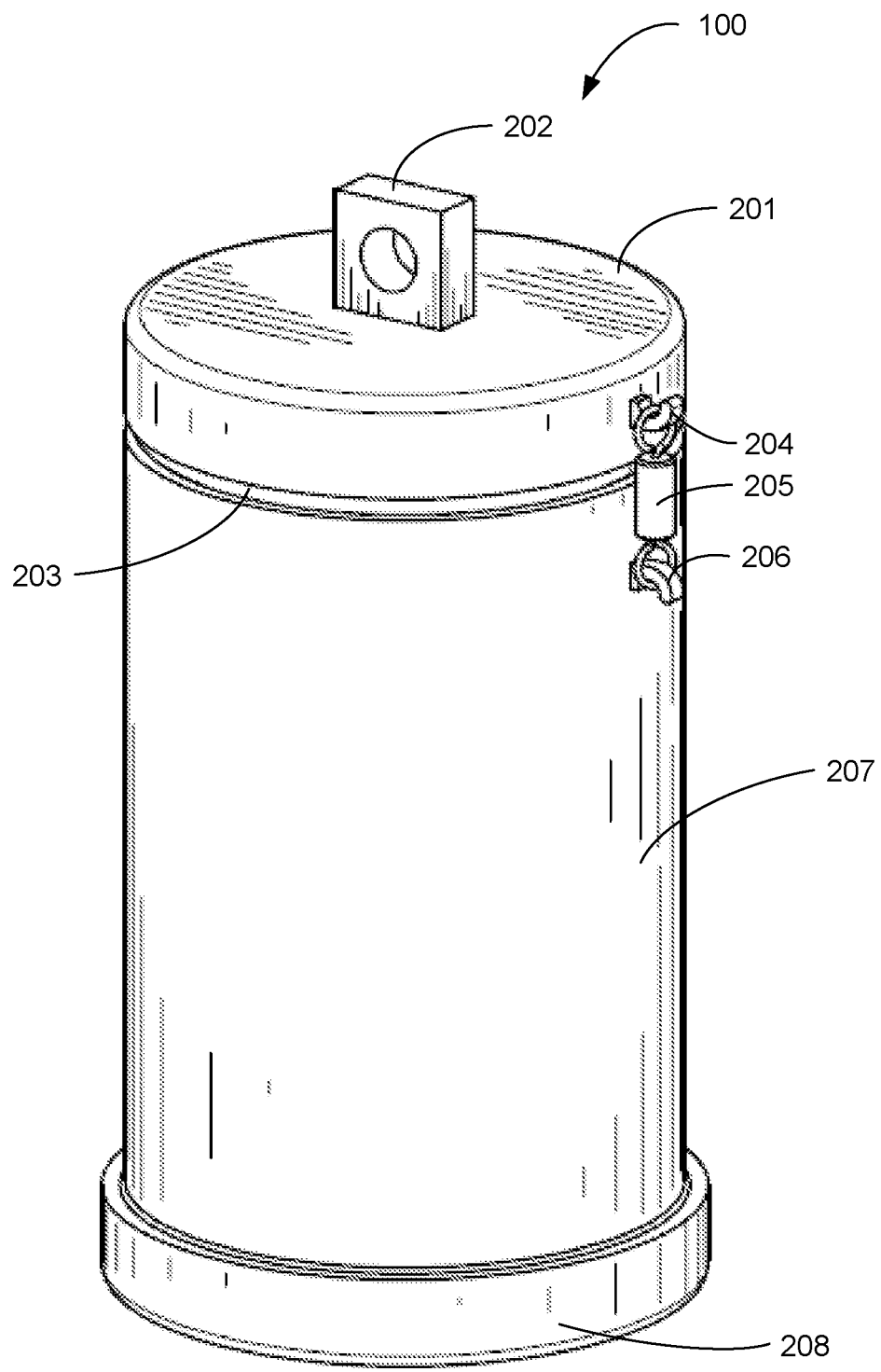
FIG. 2 illustrates an example time release bait container in a sealed state.
Figure 3:
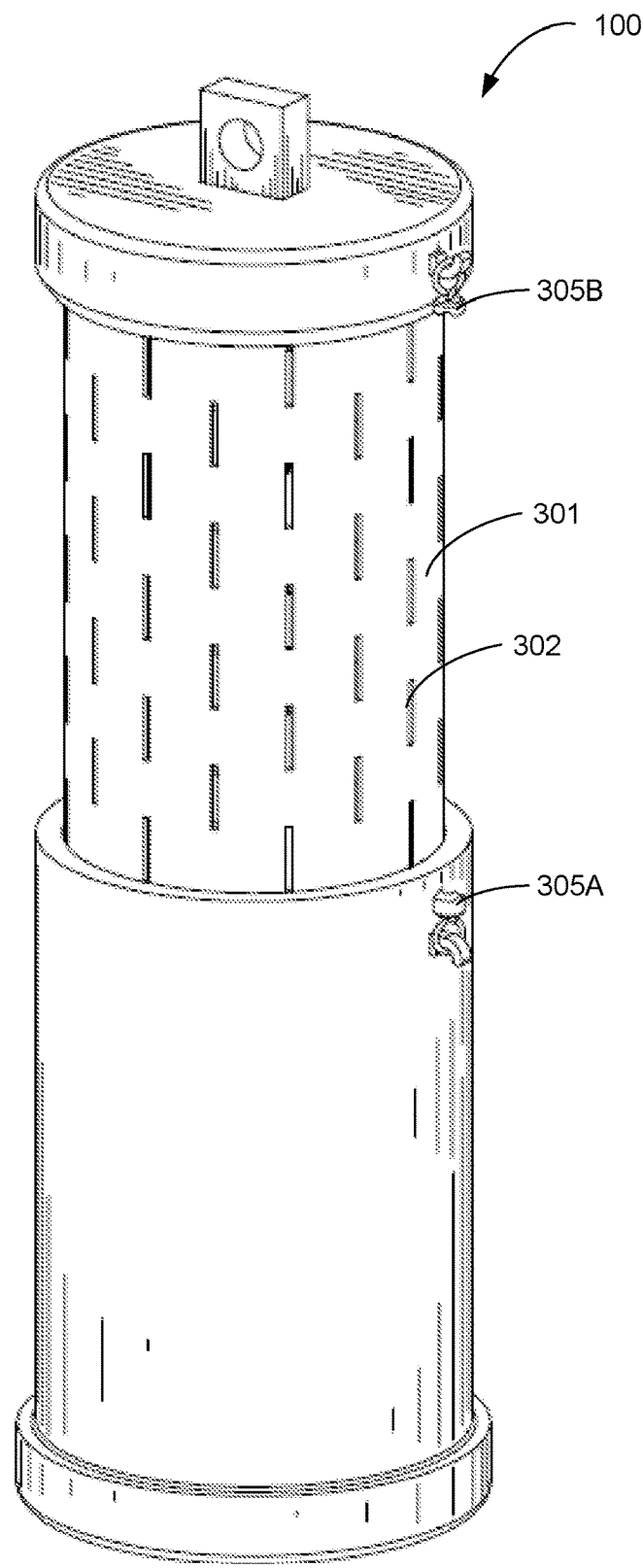
FIG. 3 illustrates the example time release bait container in a deployed state.

FIG. 2 illustrates the example time release bait container 100 in a sealed state, and FIG. 3 illustrates the example time release bait container 100 in a deployed state, in accordance with at least some embodiments of the present disclosure. The illustrated example time release bait container 100 includes, inter alia, an inner body defined in part by an inner body sidewall 301, and an outer body defined in part by an outer body sidewall 207.

The inner body can comprise the inner body sidewall 301 surrounding a bait chamber, wherein the bait chamber is a cavity inside the inner body sidewall 301. The bait chamber can comprise a top end of the bait chamber and a bottom end of the bait chamber. The inner body sidewall 301 can further comprise one or more window openings 302 therein, to allow bait scent to escape the bait chamber when the time release bait container 100 is in the deployed state illustrated in FIG. 3. The inner body can comprise an inner body lid 201 at the top end of the bait chamber. The inner body lid 201 can optionally include an attachment point 202, e.g., for use in tying the time release bait container 100 inside an aquatic trap 110. The inner body can further comprise an inner body floor 406 at the bottom end of the bait chamber.

The outer body can comprise the outer body sidewall 207 surrounding an outer body chamber, wherein the outer body chamber is a cavity inside the outer body sidewall 207. The outer body chamber can comprise a top end of the outer body chamber and a bottom end of the outer body chamber. An outer body bottom 208 can be disposed at the bottom end of the outer body chamber.

The inner body can be slidably engageable inside the outer body chamber by sliding the inner body inward and outward of the outer body chamber. The inner body sidewall 301 and the outer body sidewall 207 can be cylindrical in shape, with the diameter of the outer body sidewall 207 being larger than the diameter of the inner body sidewall 301, thereby allowing the inner body to slidably engage inside the outer body chamber. Other shapes for the circumference of the inner body sidewall 301 and the outer body sidewall 207 are also feasible, including triangular, rectangular, pentagonal, or other polygonal shapes as may be desired.

Figure 4:
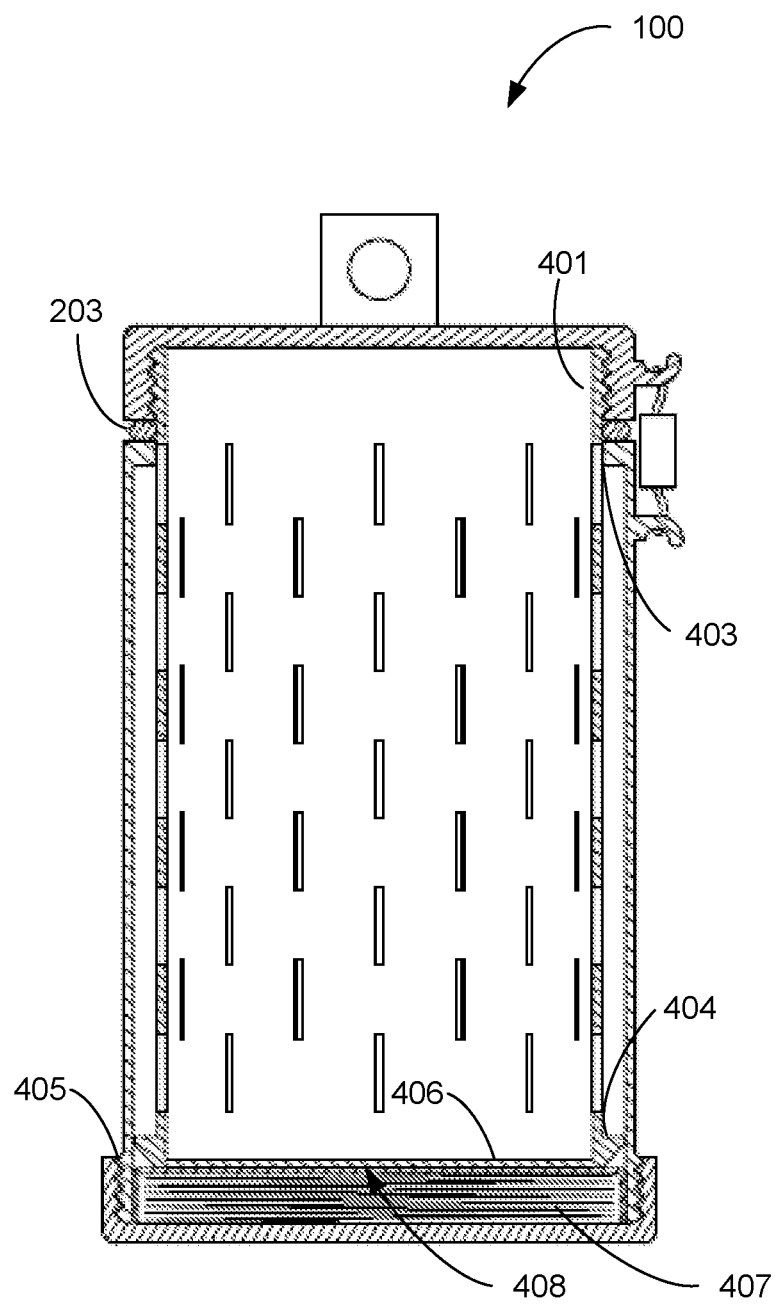
FIG. 4 is a cross sectional view of the example time release bait container in a sealed state.
Figure 5:
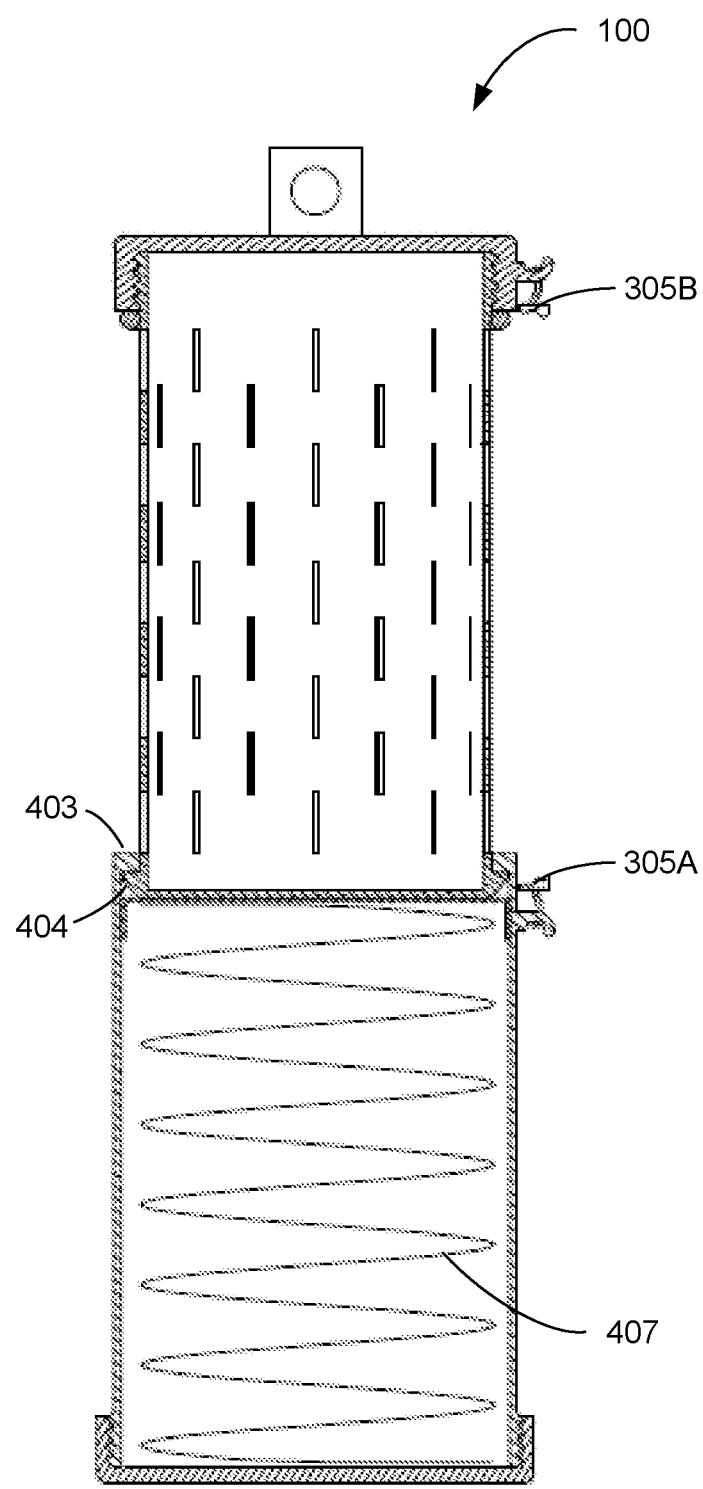
FIG. 5 is a cross sectional view of the example time release bait container in a deployed state.

FIG. 4 is a cross sectional view of the example time release bait container 100 in a sealed state, and FIG. 5 is a cross sectional view of the example time release bait container 100 in a deployed state, in accordance with at least some embodiments of the present disclosure. FIG. 4 and FIG. 5 illustrate, inter alia, an actuator 407 positioned between the outer body bottom 208 and the bottom end of the bait chamber defined by the inner body sidewall 301. The actuator 407 can apply a force to slide the inner body outward of the outer body chamber. In the illustrated embodiment, the actuator 407 is implemented by a spring, however, other actuators can optionally replace or supplement the spring in other embodiments.

In a sealed state, such as illustrated in FIG. 4, the inner body is inside the outer body chamber and the inner body lid 201 is sealed against the top end of the outer body chamber. In a deployed state, such as illustrated in FIG. 5, the inner body is at least partially outside of the outer body chamber and the inner body lid 201 is unsealed from the top end of the outer body chamber.

Returning to FIG. 2, a time release coupling 205 releasably links the inner body to the outer body to maintain the time release bait container 100 in the sealed state for a period of time. In the illustrated embodiment, the time release coupling 205 releasably links the inner body lid 201 (which is a part of the inner body) to the outer body sidewall 207. Under certain conditions, e.g., when the time release bait container 100 is immersed in salt water, the time release coupling 205 can be activated to release after the period of time to allow the time release bait container 100 to enter the deployed state by the force of the actuator 407. In the illustrated embodiment, the time release coupling 205 releases by dissolving and breaking apart. FIG. 3 illustrates resulting fragments 305A, 305B after the time release coupling 205 breaks apart.

The inner body lid 201 can be removable and re-attachable from the inner body sidewall 301. In some embodiments, the inner body lid 201 can be manually removable without the need for tools. For example, the inner body lid 201 can be female threaded and the inner body sidewall 301 can be male threaded, e.g., using the illustrated threads 401, to enable screwing the inner body lid 201 on or off of the inner body sidewall 301. Other fastening structures such as clips, magnets, snaps, ties, pressure fit, Velcro®, etc. can optionally be used to removably secure the inner body lid 201 to the inner body sidewall 301 in some embodiments. The inner body lid 201 can be removed from the inner body sidewall 301 in order to insert bait into the bait chamber, and the inner body lid 201 can be re-attached to the inner body sidewall 301 in order to secure the bait inside the bait chamber. The inner body lid 201 can comprise an attachment point 202 such as a hanger to hang the time release bait container 100 inside the aquatic trap 110.

The inner body can be slidably engageable inside the outer body chamber by sliding the inner body sidewall 301 inward (as shown in FIG. 4) and outward (as shown in FIG. 5) of the outer body chamber. In the sealed state illustrated in FIG. 4, the inner body sidewall 301 is substantially inside the outer body chamber and the inner body lid 201 can be sealed against the top portion of the outer body chamber. A seal 203 can optionally surround the inner body sidewall 301 under the inner body lid 201, and the seal 203 can be disposed between the inner body lid 201 and the top end of the outer body chamber when the time release bait container 100 is in the sealed state. The seal 203 can comprise, e.g., a rubber "o-ring" or other elastic, waterproof material.

The time release coupling 205 can be sized so that the inner body lid 201 is sealed against the top portion of the outer body chamber, with the seal 203 partially compressed, when the time release coupling 205 is in place between the attachment points 204, 206, as shown in FIG. 4. When the time release coupling 205 releases, the inner body sidewall 301 is pushed outward from the outer body chamber by the force applied by the actuator 407. The time release bait container 100 thereby enters the deployed state illustrated in FIG. 5.

A slide preventer 404 can prevent the inner body from sliding entirely out of the outer body chamber. The slide preventer 404 can comprise, e.g., an outward oriented ridge that extends from a bottom end of the inner body sidewall 301, wherein the outward oriented ridge engages an inward oriented ridge 403 that extends from the top end of the outer body chamber, as illustrated in FIG. 5. Other slide preventer structures can include, e.g., a strap, string, or band that attaches between the inner body and the outer body.

In some embodiments, the outer body bottom 208 can be configured as a bottom lid that is releasably fastened to the outer body sidewall 207. The bottom lid can be removable and re-attachable from the outer body sidewall 207. In some embodiments, the bottom lid can be manually removable without the need for tools. For example, the bottom lid can be female threaded and the outer body sidewall 207 can be male threaded, e.g., using the illustrated threads 405, to enable screwing the bottom lid on or off of the outer body sidewall 207. Other fastening structures such as clips, magnets, snaps, ties, Velcro®, etc. can optionally be used to removably secure the bottom lid to the outer body sidewall 207 in some embodiments. The bottom lid can be removed from the outer body sidewall 207 in order disassemble the time release bait container 100, and the bottom lid can be re-attached to the outer body sidewall 207 in order to reassemble the time release bait container 100.

The actuator 407 can be positioned between the inner body floor 406 at the bottom end of the bait chamber, and the outer body bottom 208. The actuator 407 can comprise, e.g., a spring, a magnet assembly, an elastic element, a compressed gas, or another actuator mechanism. In the illustrated embodiment, the actuator 407 is configured to apply a continuous force on the inner body floor 406 while the time release bait container 100 is in the sealed state, and the force moves the inner body outward when the time release coupling releases. In an alternative embodiment, the actuator 407 can optionally be activated by release of the time release coupling. For example, in some embodiments, the actuator 407 can be activatable by a switch or other link to the time release coupling 205. A slidable barrier 408 such as a spring cap can optionally be positioned inside the outer body chamber between the actuator 407 and inner body floor 406 at the bottom end of the bait chamber.

In an example embodiment, the time release coupling 205 can comprise a galvanic couple, such as a zinc anode. Different galvanic couples can be designed to corrode/dissolve in sea water in different periods of time. An appropriate galvanic couple can be selected in order to select a corresponding desired time period preceding bait deployment. For example, galvanic couples that dissolve (and therefore release) in periods ranging anywhere from one half hour to multiple days may be desired under various different fishing conditions and circumstances. Other substances that dissolve in water/seawater can also be used in a time release coupling 205, e.g., certain fabrics and soluble metals or compressed soluble materials. Electronic embodiments are also feasible, in which an electronic timer triggers an electrically activated time release coupling 205 after a preprogrammed period of time.

The time release coupling 205 can extend between a first attachment point 204 on the inner body lid 201 and a second attachment point 206 on the outer body sidewall 207. Of course, other placements of the attachment points 204, 206 are possible. In some embodiments, for example, both attachment points may be on the outer body sidewall 207 and the time release coupling 205 can comprise a strap or wire that extends over the inner body lid 201.

Figure 7:
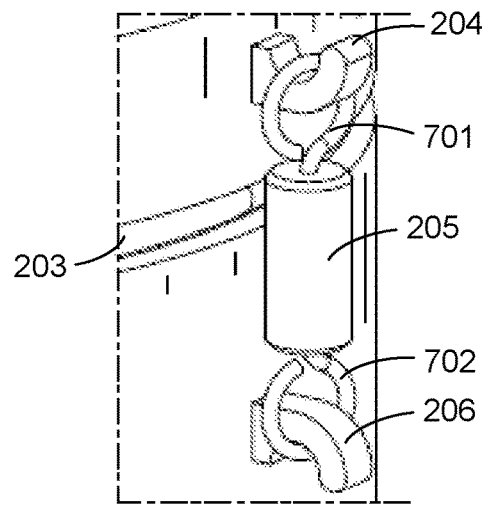
FIG. 7 is a magnified view of an example time release coupling for use in connection with the time release bait container.

The first and/or the second attachment point 204, 206 can optionally comprise an open-ended member that extends laterally from the time release bait container 100. The attachment points 204, 206 can optionally be shaped as hooks or pins, as shown, so that the shape inhibits the time release coupling 205 from accidentally sliding off of the attachment points 204, 206. The time release coupling 205 can be removable, and optionally, manually removable and replaceable between the first and the second attachment points 204, 206. FIG. 7 provides a magnified view of the time release coupling 205 and the attachment points 204, 206.

Figure 6:
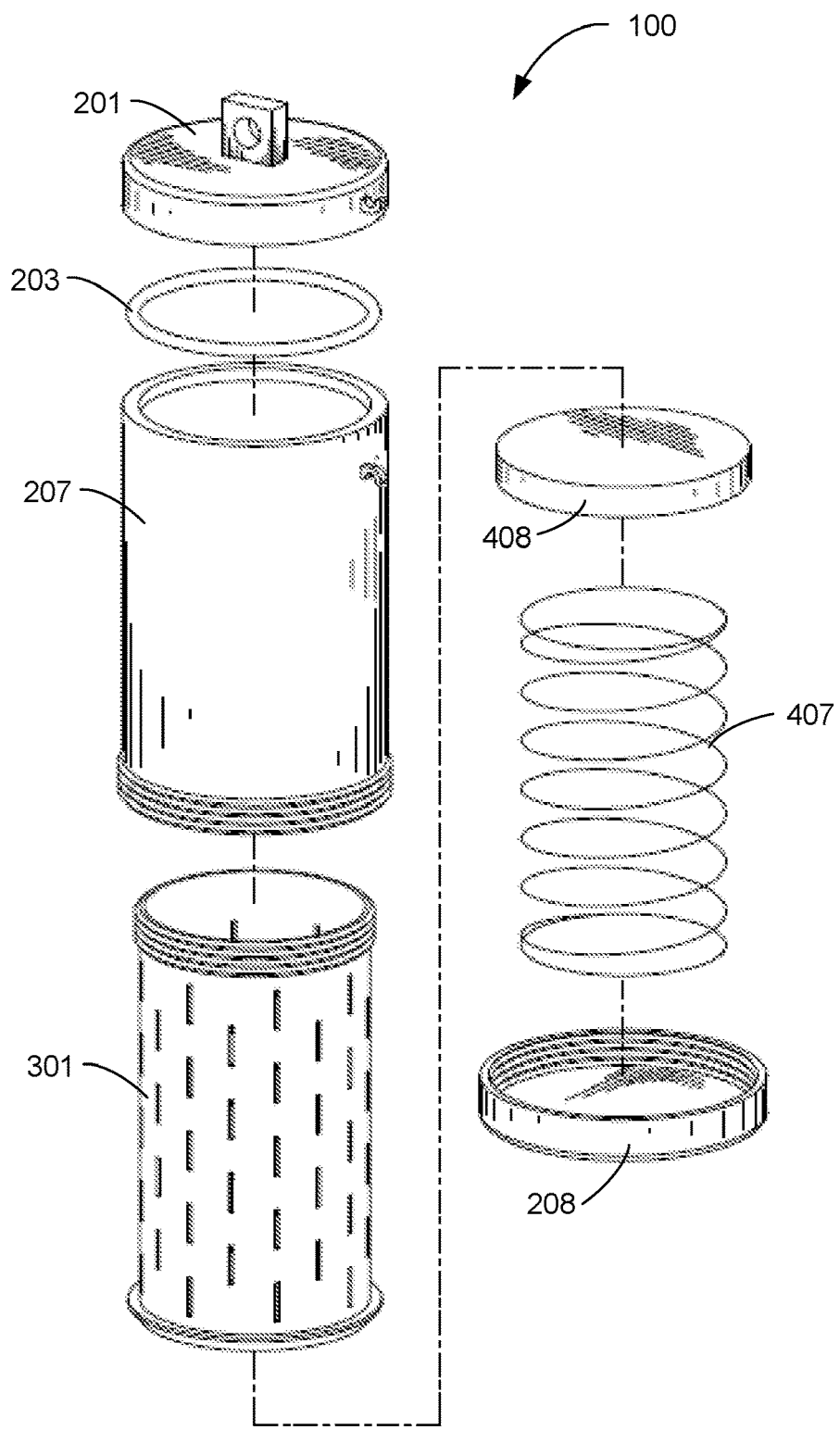
FIG. 6 is an exploded view showing components of the example time release bait container and assembly thereof.

FIG. 6 is an exploded view showing example components of the time release bait container 100 and assembly thereof. FIG. 6 illustrates the outer body bottom 208, the actuator 407, the slidable barrier 408, the inner body sidewall 301, the outer body sidewall 207, the seal 203, and the inner body lid 201.

FIG. 6 illustrates assembly of the illustrated components. For example, the inner body sidewall 301 can be slid into the outer body sidewall 207 from the bottom end thereof. The seal 203 can then be placed around the inner body sidewall 301, and the inner body lid 201 can next be fastened atop the inner body sidewall 301. The slidable barrier 408 can be placed over the actuator 407 and the slidable barrier 408 and actuator 407 can be slid into the outer body sidewall 207 from the bottom end thereof. Finally, the outer body bottom 208 can be fastened to the bottom of the outer body sidewall 207.

To use the assembled time release bait container 100, the inner body lid 201 can be removed from the the inner body sidewall 301, and bait can be inserted into the bait chamber. The inner body lid 201 can be fastened atop the inner body sidewall 301, and the inner body can be slid into the outer body chamber. A desired time release coupling 205, associated with a determined delay period, can be selected and installed on the attachment points 204, 206. Finally, the time release bait container 100 can be fastened or otherwise placed inside an aquatic trap 110.

In some embodiments, time release bait containers according to this disclosure can be manufactured by molding the outer body bottom 208, the slidable barrier 408, the inner body sidewall 301, the outer body sidewall 207, and the inner body lid 201. Injection molding, rotor molding, or any other mold fabrication techniques can be used. The seal 203, the actuator 407, and optionally the time release coupling 205 can be ordered from component suppliers. An assembly process can proceed according to the assembly description above. The components can be made from materials such as PVC, plastic, composite, stainless steel, or other suitably lightweight and sturdy materials.

FIG. 7 is a magnified view of an example time release coupling for use in connection with the time release bait container. FIG. 7 illustrates the time release coupling 205, wherein the time release coupling 205 comprises a galvanic couple midsection and a wire-loop "eye" 701 and 702 extending from each of the top and bottom of the galvanic couple midsection. FIG. 7 furthermore illustrates the example attachment points 204, 206 and the seal 203.

As can be observed in FIG. 7, the distance between the attachment points 204, 206 can be configured to match the length of the time release coupling 205. More particularly, the distance between the attachment points 204, 206 when the seal 203 is partially compressed can be configured to match the length between the inner edges of the wire-loop "eyes" of the time release coupling 205. The extent to which at least one of the attachment points 204, 206 extends upward (to prevent the time release coupling 205 from falling off) can be limited to an available remaining compression displacement of the seal 203, so that the time release coupling 205 can be installed and removed. The length of the attachment points 204, 206 can be long enough to accommodate several different time release coupling 205 widths, allowing the use of different time release couplings 205 with the time release bait container 100.

Figure 8:
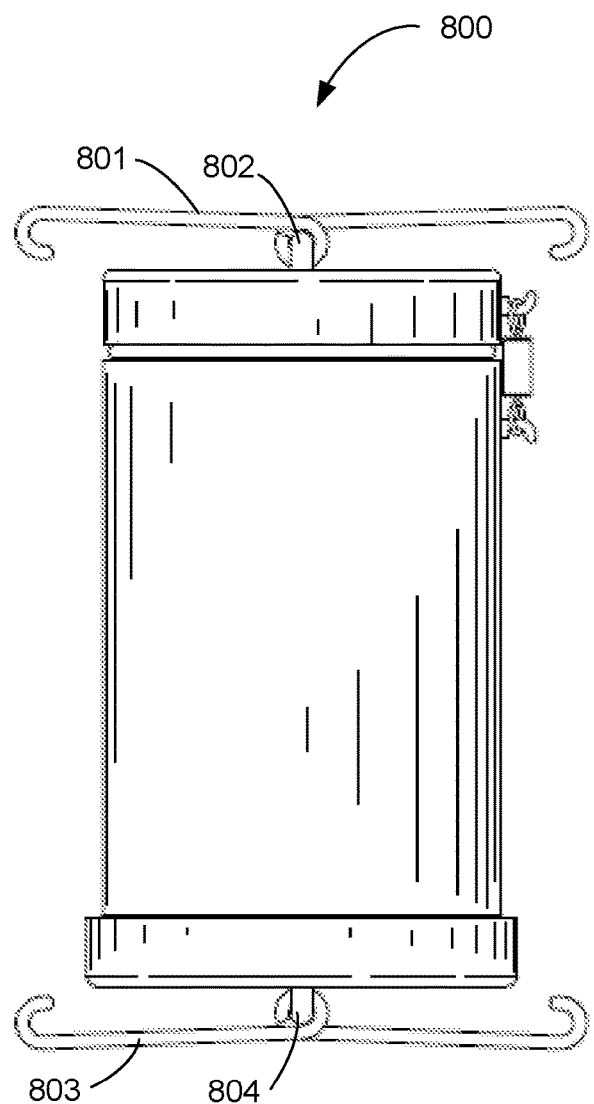
FIG. 8 illustrates an example time release bait container comprising hooks that facilitate deployment into aquatic traps.

FIG. 8 illustrates an example time release bait container 800 comprising hooks 801, 803 that facilitate deployment into aquatic traps. In FIG. 8, the inner body lid and the outer body bottom each comprise a respective hook structure 801, 803 affixed thereto. The inner body lid and the outer body bottom each comprise a respective attachment point 802, 804 to which the hook structures 801, 803 are affixed. In another embodiment, the hook structures 801, 803 can be molded parts that are integrated as a single piece with the inner body lid or the outer body bottom.

The illustrated hook structures 801, 803 are double sided hooks, however, embodiments using single hooks, or three or more hooks, are also possible. The hook structures 801, 803 can facilitate deployment of the time release bait container 800 by eliminating or reducing the need to tie or otherwise attach the time release bait container 800 in an aquatic trap 110. Instead, the time release bait container 800 can be tossed inside an aquatic trap 110 with confidence that the time release bait container 800 will not fall out during fishing.

While various embodiments have been disclosed herein, other aspects and embodiments will be apparent to those skilled in art.

What is claimed is:
1. A time release bait container, comprising:
an inner body comprising an inner body sidewall surrounding a bait chamber, the bait chamber comprising a top end of the bait chamber and a bottom end of the bait chamber;
an inner body lid at the top end of the bait chamber;

an outer body comprising an outer body sidewall surrounding an outer body chamber, the outer body chamber comprising a top end of the outer body chamber and a bottom end of the outer body chamber;

an outer body bottom at the bottom end of the outer body chamber;

wherein the inner body is slidably engageable inside the outer body chamber by sliding the inner body inward and outward of the outer body chamber;

an actuator positioned between the bottom end of the bait chamber and the bottom end of the outer body chamber, wherein the actuator applies a force to slide the inner body outward of the outer body chamber;

a slidable barrier positioned inside the outer body chamber between the actuator and the bottom end of the bait chamber, the slidable barrier comprises a circular top and a rim encircling the top and extending downwardly from the top to form an actuator cap, the rim encircling the exterior of the actuator to receive the actuator therein whereby the actuator is disposed within the rim and spaced from the outer body sidewall;

wherein, in a sealed state, the inner body is inside the outer body chamber and the inner body lid is sealed against the top end of the outer body chamber;

wherein, in a deployed state, the inner body is at least partially outside of the outer body chamber and the inner body lid is unsealed from the top end of the outer body chamber; and a time release coupling that releasably links the inner body to the outer body to maintain the time release bait container in the sealed state for a period of time, wherein the time release coupling releases after the period of time to allow the time release bait container to enter the deployed state by the force of the actuator.

2. The time release bait container of claim 1, wherein the actuator comprises a spring.

3. The time release bait container of claim 1, further comprising a slide preventer that prevents the inner body from sliding entirely out of the outer body chamber.

4. The time release bait container of claim 3, wherein the slide preventer comprises an outward oriented ridge that extends from a bottom end of the inner body sidewall, wherein the outward oriented ridge engages an inward oriented ridge that extends from the top end of the outer body chamber.

5. The time release bait container of claim 1, wherein the inner body sidewall comprises one or more window openings therein.

6. The time release bait container of claim 1, further comprising a seal surrounding the inner body sidewall under the inner body lid, wherein the seal engages the top end of the outer body chamber when the time release bait container is in the sealed state.

7. The time release bait container of claim 1, wherein the inner body lid is removable from the inner body sidewall.

8. The time release bait container of claim 1, wherein the inner body lid is female threaded and wherein the inner body sidewall is male threaded in order to screw the inner body lid on or off of the inner body sidewall.

9. The time release bait container of claim 1, wherein the time release coupling comprises a galvanic couple.

10. The time release bait container of claim 9, wherein the galvanic couple extends between a first attachment point on the inner body lid and a second attachment point on the outer body sidewall.

11. The time release bait container of claim 10, wherein the first and the second attachment points comprise projections that extend laterally from the time release bait container, and wherein the galvanic couple is removable and replaceable between the first and the second attachment points.

12. The time release bait container of claim 9, wherein the galvanic couple comprises a zinc anode.

13. The time release bait container of claim 9, wherein the inner body and the outer body are cylindrical.

14. The time release bait container of claim 1, wherein the outer body bottom comprises a bottom lid that is releasably fastened to the outer body sidewall.

15. The time release bait container of claim 1, wherein the inner body comprises an inner body floor at the bottom end of the bait chamber, the inner body floor fixed to the inner body.

16. The time release bait container of claim 1, wherein at least one of the inner body lid and the outer body bottom comprises a hook structure affixed thereto, the hook structure extending diametrically across and beyond the other outer perimeter of at least one of the inner body lid and the outer body bottom, the hook structure comprising end portions defining open ended hooks.

17. The time release bait container of claim 16, wherein the hook structure comprises a double sided bend, the double sided bend extending beyond the outer perimeter of at least one of the inner body lid and the outer body bottom.

* * * * *